United States Patent [19]

Medwed et al.

[11] Patent Number: 5,010,714
[45] Date of Patent: Apr. 30, 1991

[54] PACKAGING MACHINE

[75] Inventors: Emmerich Medwed, Wolfertschwenden; Engelbert Wiest, Dietmannsried, both of Fed. Rep. of Germany

[73] Assignee: 501 Multivac Sepp Haggnemuller KG, Olfertschwenden, Fed. Rep. of Germany

[21] Appl. No.: 559,901

[22] Filed: Jul. 30, 1990

[30] Foreign Application Priority Data

Aug. 3, 1989 [DE] Fed. Rep. of Germany ....... 3925746

[51] Int. Cl.⁵ .......................... B65B 7/28; B65B 61/18
[52] U.S. Cl. .......................................... 53/412; 53/453; 53/486; 53/559; 53/133.3; 53/373.7; 29/521
[58] Field of Search ................. 53/412, 453, 485, 586, 53/133, 559, 329, 371, 373; 229/123.1; 220/613, 621; 426/129; 29/509, 521

[56] References Cited

U.S. PATENT DOCUMENTS

| 2,960,255 | 11/1960 | Blane | 220/621 |
| 3,311,229 | 3/1967 | Troll et al. | |
| 3,404,648 | 10/1968 | Rosbottom | 29/509 X |
| 3,760,563 | 9/1973 | Zimmerman | 53/329 |
| 3,771,216 | 11/1973 | Johnson | 29/509 |
| 3,792,181 | 2/1974 | Mahaffy | 426/123 |
| 4,167,092 | 9/1979 | Medwed | 53/373 |

FOREIGN PATENT DOCUMENTS

0320113A1 6/1989 European Pat. Off. .

Primary Examiner—John Sipos
Attorney, Agent, or Firm—Donald Brown

[57] ABSTRACT

A packaging machine comprises a deep drawing station for deep drawing containers in a film sheet and a sealing station for sealing filled containers by means of a cover sheet. For obtaining a reclosable package means are provided for forming protuberances in the edge of the packages, wherein the protuberances cooperate for reclosing the container.

14 Claims, 6 Drawing Sheets

PACKAGING MACHINE

BACKGROUND OF THE INVENTION

The invention relates to a packaging machine and in particular to a packaging machine for packing products in containers formed in a sheet material and sealed with a cover sheet. The invention also relates to a package produced by such a packaging machine and a method of producing such a package.

It is generally known to provide packaging machines forming containers in a sheet material, filling the containing and closing the containers by sealing a cover sheet to an edge of the containers in an evacuation and sealing station. It is further known from the U.S. Pat. No. 3,792,181 to provide formed containers of that kind which can be reclosed after opening the same by removing the cover sheet from the sealed edge. To this end the upper portion of the container adjacent to the container edge comprises a bulbous depression. The cover sheet has a projecting protuberance at the corresponding location. The protuberance is pressed into the depression for reclosing the container. The connection is locked by friction between the cover and the container. A disadvantage of such a package is the troublesome forming process because of the undercut-type depression. Such a depression must be formed in the container already in the deep drawing station and in the cover sheet in the sealing station while keeping to close tolerances. Additionally the particular deformation of the container must be designed and formed for each container mold individually, because it forms part of the actual container mold. Whenever the size of the product is changed, the container and the apparatus for producing the depression must also be changed. It is further known from the aforementioned patent to design the edge surrounding the actual containers such that a nose of the container edge engages the cover sheet or two differing cuts in the container edge and in the cover sheet are brought into mutual engagement. However, these engagements only provide for a limited connection and complicated handling, resp.

The U.S. Pat. No. 3,311,229 discloses a package for tablets held between two sheets which are connected by means of a snap fastener formed by deformation of one or both sheets.

OBJECTS OF THE INVENTION

It is an object of the invention to provide an improved packaging machine in which the aforementioned drawbacks of the prior art are avoided. It is a further object of the invention to provide a packaging machine capable of producing a package in a simple manner which is easily and firmly reusable after opening thereof. It is a still further object of the invention to design the means for producing the reclosable connection such that it can be used for different product sizes.

SUMMARY OF THE INVENTION

In order to achieve the above objects the invention provides a packaging machine comprises a sealing station for sealing a filling container having an edge surrounding said container and defining an edge plane, said sealing station having means for supplying a cover sheet to said container and sealing said cover sheet to said edge, means for forming at least one protuberance in said edge, said protuberance projecting from said edge plane, and means for backforming a central region of said protuberance towards said edge plane such that an edge region of said backformed protuberance substantially converges from said edge towards said central region. The invention further provides a method for producing a reclosable package comprising the steps of forming in a bottom sheet a container having a surrounding edge defining an edge plane, closing said container by means of a cover sheet sealed to said edge, deforming at least one portion of said edge to form a protuberance projecting from said edge plane in both sheets, and backforming a central region of said protuberance towards said edge plane such that an edge region of said backformed protuberance substantially converges from said edge towards said central region.

BRIEF DESCRIPTION OF THE DRAWINGS

Other objects and advantages of the invention will be apparent to those skilled in the art from the following description of an exemplary embodiment with reference to the drawings, wherein.

Figure 1:
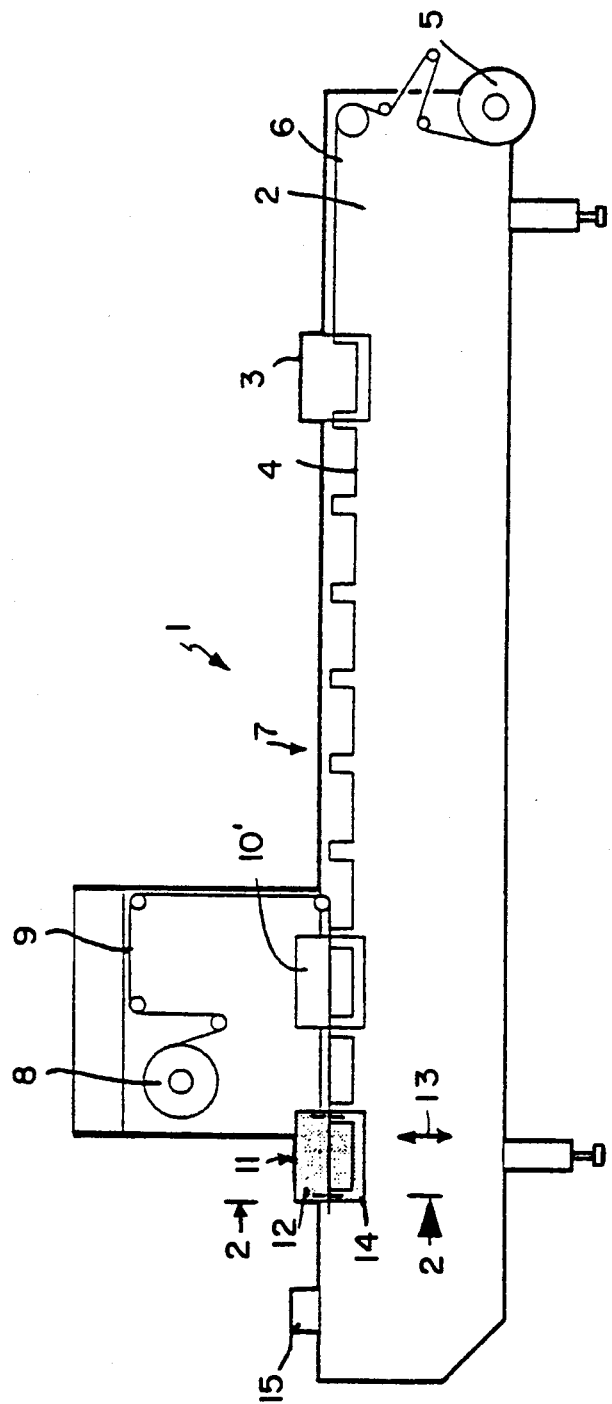
FIG. 1 is a side view of a packaging machine with omitted side wall.

The packaging machine 1 comprises a machine frame 2 with a deep drawing station 3 mounted thereon for forming deep drawn containers 4 in a film sheet 6 drawn from a supply roll 5. In conventional manner grippers carried on endless chains laterally catch the sheet and transport the same from the inlet end to the opposite outlet end of the packaging machine. Subsequent to the deep-drawing station 3 a filling section 7 is provided for loading the product to be packaged into the formed containers. At the end of the filling section a cover sheet 9 is supplied from a supply roll 8 such that it covers the packages. The packages are sealed or welded, resp., at the edge 10 thereof surrounding the actual package space in an evacuation and sealing station 10'. Subsequent to the evacuation and sealing station 10' means for forming reclosably cooperating protuberances in the edge of the packages are provided and shown as a work station 11 having an upper part 12 which is rigidly connected to the machine frame and a lower part 14 which can be lowered relative to the upper part in direction of arrow 13 into the open position and raised into the closed position shown in FIG. 1 by means of a (not shown) piston and cylinder means. The work station is followed in feed direction by cutting means 15 for severing the packages to produce individual packages.

The upper part 12 of the work station 11 comprises a frame 16 connected to the machine frame. The frame 16 has a recess 17' on the side thereof opposite to the lower part 14 and bores 17 positioned in two opposite regions of the edge 10 and extending perpendicular to the plane of the edge. Sleeve inserts 18 forming slideways are arranged within the bores. Bolt-shaped pins 19 are guided in the inserts 18. The ends of the pins 19 opposite to the lower part 14 are mounted to a common actuating plate 20. Respective compression springs 21 are provided between the actuating plate 20 and each insert 18 for biasing the actuating plate 20 into the retracted position shown in FIG. 2 such that the pins 19 are pulled into the bores of the inserts to such an extent that they do not project therebeyond towards the opposite lower part 14. A diaphragm means 23 having a fluid inlet 24 connected with a (not shown) compressed air system is arranged between the acutating plate 20 and a cover plate 22 covering the recess 17'. The diaphragm means operates to move the actuating plate 20 to push the pins 19 against the action of the compression spring 21 towards the lower part 14 in the manner described further below. The inserts 18 are inserted into the frame 16 in such a manner that a plane lower surface facing the lower part 14 is obtained.

Figure 2:
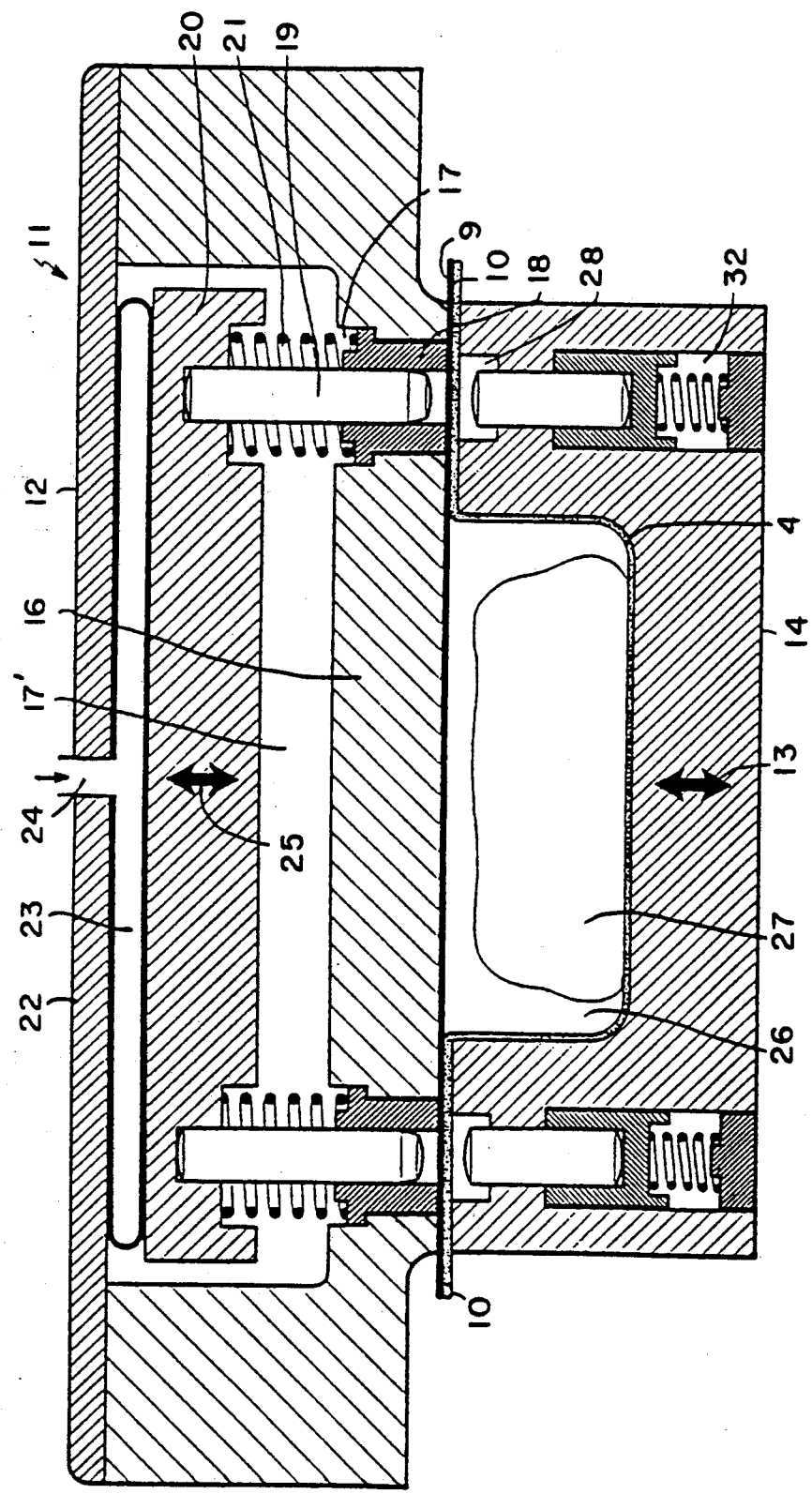
FIG. 2 is a cross-section taken on line II—II in FIG. 1.

In the manner best shown in FIG. 2 the inserts 18 are inserted into the bores 17 from the recess side and have a shoulder resting on an enlarged section of the bore 17 facing the recess. This facilitates the assembly operation.

Figure 3:
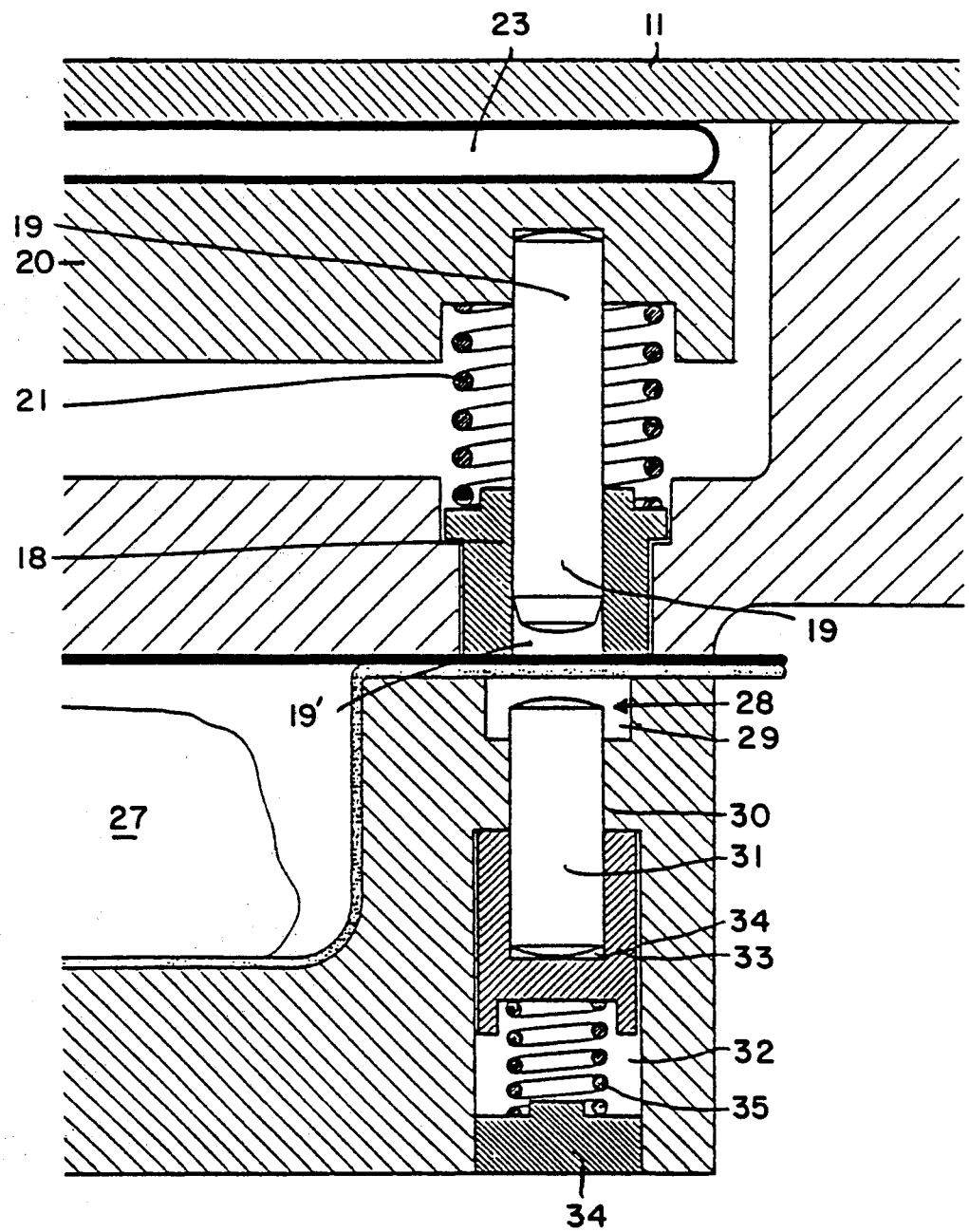
FIG. 3 shows a portion of the cross-section of FIG. 2 on an enlarged scale in a first position.

The lower part 14 has a recess 26 on the side thereof facing the upper part for receiving the package 4 with the product 27 therein. Bores 28 are provided coaxially to the bores 17 at location facing and aligned with the inserts 18. As best shown in FIG. 3 the bores 28 have a first portion 29 on the side facing the upper part and the diameter of the first portion is larger than the outer diameter of the pin 19. Preferably the width of the first portion amounts to about the sum of the diameter of the pin 19 and three to five times the thickness of upper and lower sheet together. The depth of the bore 28 is preferably selected as about half of the width of the bore 28.

The portion 29 is coaxially followed by a second portion 30 having a diameter which is substantially equal to the diameter of the bore in the inserts 18. Respective second pins 31 are guided in each second portion 30. A respective third coaxial portion 32 follows at the side opposite to the upper part. The diameter of the third portion 32 is greter than that of the second portion 30. Each third portion has an insert 33 sliding therein. The insert 33 has a bore 34 with an associated pin 31 fixed therein and is slidably displaceable in the portion 32 together with the pin 31. The open end of the bore is closed by an end piece 34' fixed therein. A respective compression spring 35 is provided between each insert 33 and end piece 34' and biases the insert and the pin into the position shown in FIG. 3 to such an extent that the pin 31 projects into the first portion 29 by slightly more than half of the depth of portion 29.

A pin 31 has a rounded end facing the upper part.

In opertion the lower part is first in a lowered position. Thereafter the package with the actual container 4 and the cover sheet 9 sealed thereto at the edge region 10 is introduced into the work station 11. Thereupon the lower part is lifted into the closed position shown in the Figures, whereby the edge 10 is clamped between the facing surfaces of the upper and lower part as shown in FIG. 2 and 3.

Figure 4:
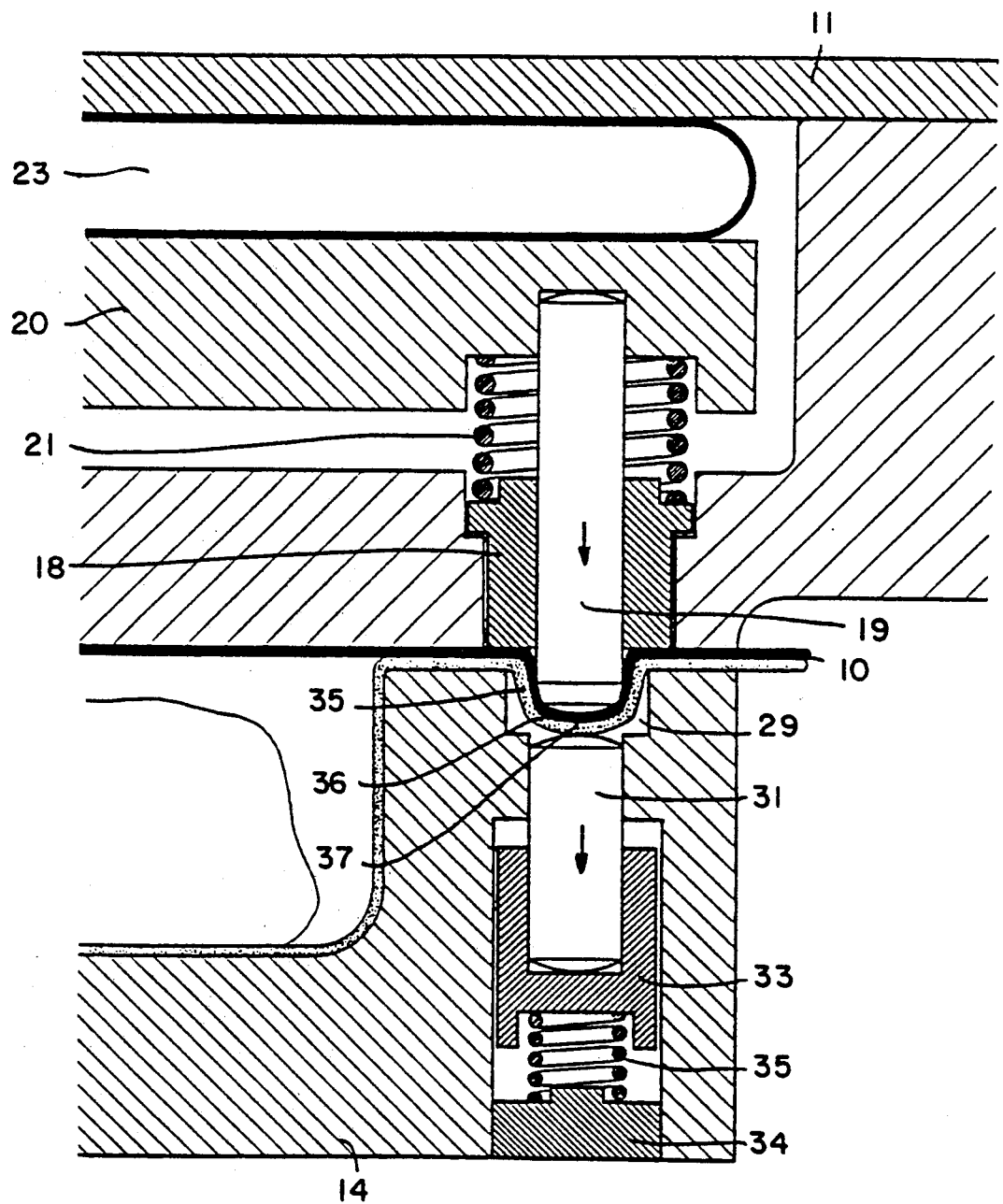
FIG. 4 shows the portion of FIG. 3 in a second position.

In the next phase the actuating plate 20 is moved into the position shown in FIG. 4 against the biasing force of spring 21 by supply of compressed air to the diaphragm means 23. As a consequence thereof the pins 19 are pushed out of the inserts 18 into the portions 29 and push the corresoponding portion of the edge 10 into the portion 29. The pins 19 and the deformed sheet contact the pins 31 and push these together with the insert 33 into the retracted position shown in FIG. 4 against the action of springs 35. This results in the generation of a protuberance formed in the edge of the two sealed sheeted such that laterally of the respective pin 19 the protuberance has a substantially vertical edge portion 35 adjacent to the plane of the edge.

Figure 5:
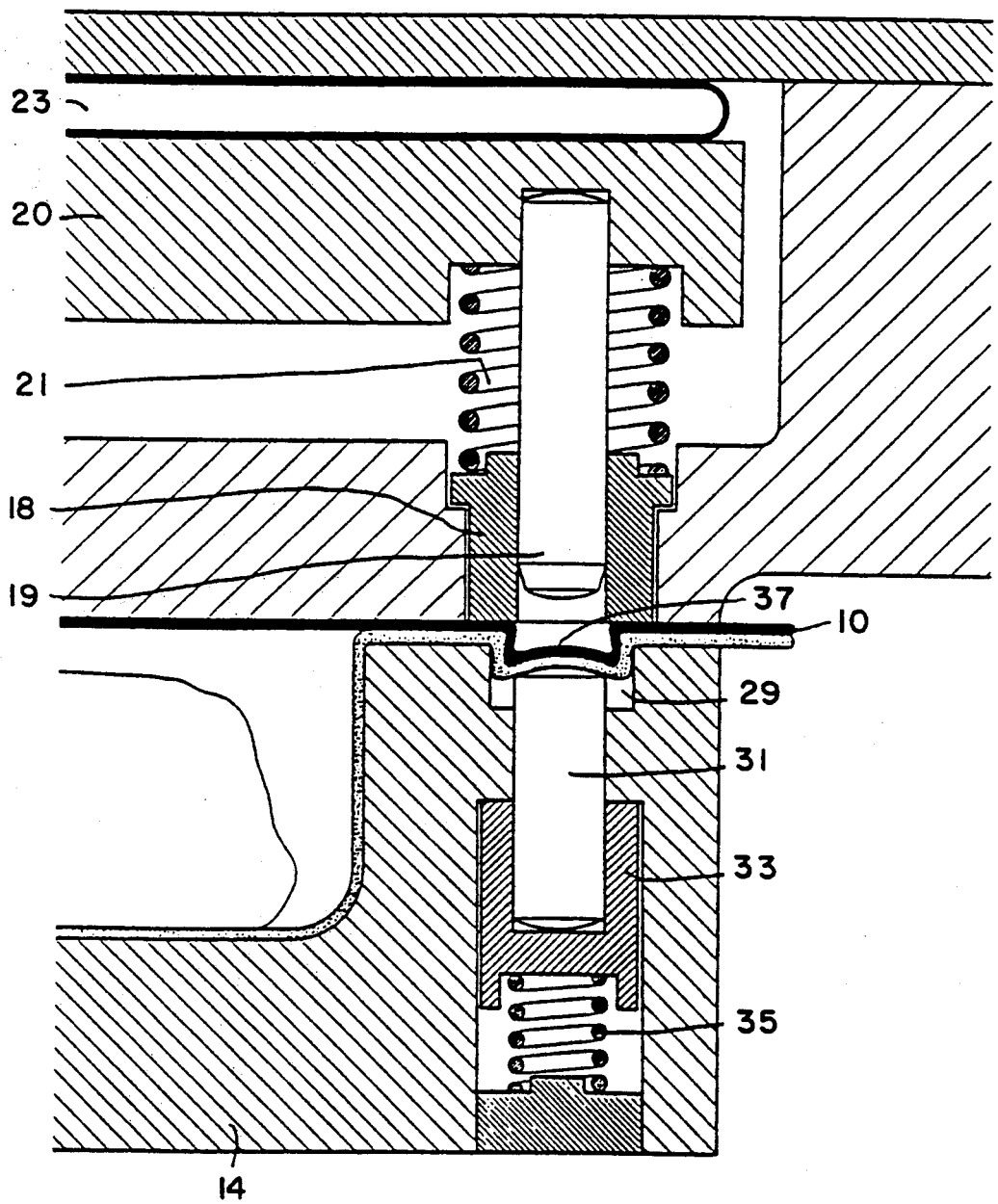
FIG. 5 shows the portion of FIGS. 3 and 4 in a third working position.
Figure 6:
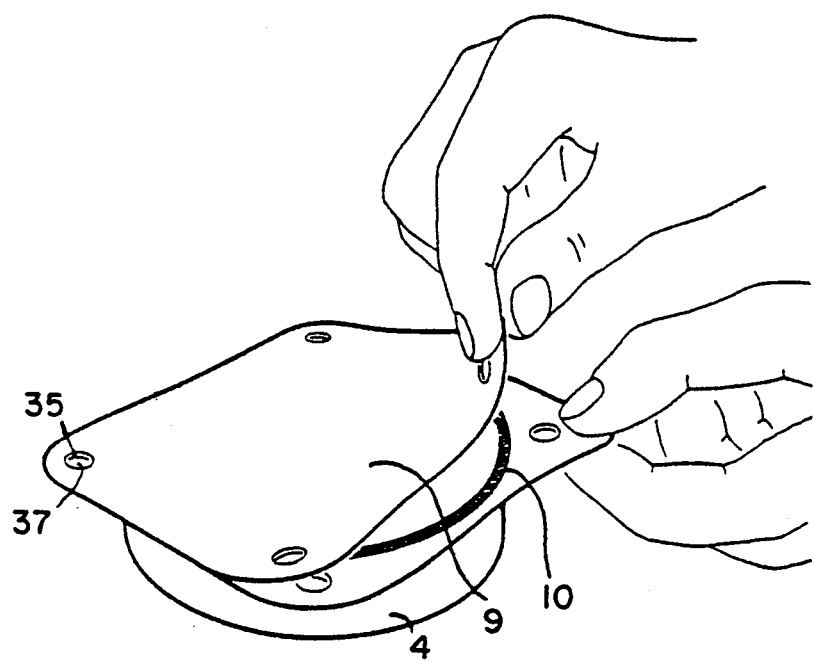
FIG. 6 is a perspective representation of a partly opened reclosable package.
Figure 7:
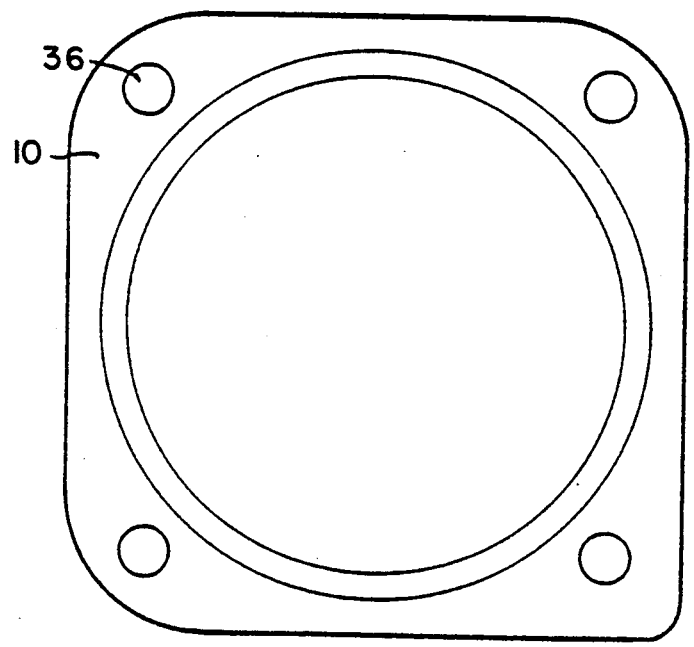
FIG. 7 is a top view on the package of FIG. 6 in closed state.

In the following phase the diaphragm means 23 is ventilated. The spring force of the compression spring 21 removes the pins 19 into the position shown in FIG. 5. By action of compression springs 35 the respective second pin 31 is forced back through the inserts 33 from the position shown in FIG. 4 into the start position of FIG. 5. During this movement the pin 31 presses onto the depression or protuberance 36 in the edge 10 as generated in the preceding phase and the rounded or nearly spherical free end of the pin 31 forms an opposite curvature as shown in FIG. 5 in the central portion 37. Owing to the fact that the bore diameter in the opposite insert 18 in the upper part equals to the diameter of the pin 19, the wall portion adjacent to the bore rests on the nearly coaxially deformed edge portion 35'. This results for the redeformation shown in FIG. 5 in a slight outward bulging of the edge portion 35' adjacent to the edge 10 into the portion 29. In this manner a depression is formed in the edge portion of the container 4 and a correspondingly deformed protruding portion which exactly fits into the depression is formed at the corresponding position of the cover sheet.

After this deformation phase the lower part 14 is lowered and the packages are moved on with a new package being introduced for the next phase.

Semi-rigid sheet material having a thickness of 100 μm up to about 400 μm is used for the lower sheet and the cover sheet. Possible materials are PVC, polyester or polystyrol, each being laminated together with a respective sealing layer. In use the cover sheet is drawn from the lower sheet forming the container 4 at the edge 10 for opening the package. The container is reclosed by connecting the cover sheet and the lower sheet at their deformed portions in the manner of a snap fastener. The resilient effect of the spring in a snap fastener is obtainer by the convex central portion 37 directed into the protuberance or bulged portion.

While the invention has been described in preferred form it is not limited to the precise nature shown as various modifications may be made without departing from the scope of the appended claims.

What is claimed is:

1. Packaging machine comprising a sealing station for sealing a filled container having an edge surrounding said container and defining an edge plane, said sealing station having means for supplying a cover sheet to said container and sealing said cover sheet to said edge, means for forming reclosable closures in said cover sheet and container edge, said means comprising means forming at least one protuberance in said cover sheet and edge, said protuberance projecting from said edge plane, and means for backforming a central region of said protuberance towards said edge plane such that an edge region of said backformed protuberance substantially converages from said edge towards said central region.

2. The packaging machine of claim 1, comprising a first pin extending transversely to the sheet surface of said edge and drive means for moving said pin in direction towards said sheet for generating said protuberance.

3. The packaging machine of claim 2, comprising a first tool member lying, in operation, close to one of the sheets and a second tool member being movable in relation thereto, said edge surrounding the protuberances to be formed being clamped between said two tool members in operation.

4. The packaging machine of claim 3, wherein said first pin is guided in a bore provided in one of said tool members and the other of said tool members has a recess at a position facing said bore, the diameter of said recess being greater than the diameter of said pin.

5. The packaging machine of claim 4, wherein said second tool member comprises a second pin provided at a position facing said first pin, said second pin being displaceable in direction towards said sheets.

6. The packaging machine of claim 4, wherein said first pin has a rounded end at the side thereof facing said edge.

7. The packaging machine of claim 5, wherein said second pin has a rounded end at the side thereof facing said edge.

8. The packaging machine of claim 5, wherein said second pin is smaller in diameter than said recess.

9. The packaging machine of claim 5, wherein said pins are guided to be movable along a common axis.

10. The packaging machine of claim 5, comprising a spring for biasing said second pin into a rest position, said second pin being movable into a retracted position against the force of said spring.

11. The packaging machine of claim 10, wherein said first pin displaces said second pin towards the retracted position thereof when said first pin acts upon said sheets.

12. The packaging machine of claim 1, comprising a deep-drawing station for deep-drawing containers in a film sheet, said deep-drawing station being provided at the inlet end of the packaging machine.

13. A method for producing a reclosable package comprising the steps of
    forming in a bottom sheet a container having a surrounding edge defining an edge plane,
    closing said container by means of a cover sheet sealed to said edge,
    deforming at least one portion of said edge to form a protuberance projecting from said edge plane in both sheets, and
    backforming a central region of said protuberance towards said edge plane such that an edge region of said backformed protuberance substantially converges from said edge towards said central region to thereby form reclosable closures in said cover sheet and container edge.

14. The method of claim 13, wherein said central region is formed in the backforming step to have a convex shape towards said edge.

* * * * *